United States Patent
Terabe

(10) Patent No.: US 8,000,340 B2
(45) Date of Patent: Aug. 16, 2011

(54) PARAMETER DETERMINATION BASE STATION EMPLOYING PCSS SCHEME

(75) Inventor: Shigeo Terabe, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1052 days.

(21) Appl. No.: 11/878,906

(22) Filed: Jul. 27, 2007

(65) Prior Publication Data

US 2007/0268851 A1 Nov. 22, 2007

Related U.S. Application Data

(62) Division of application No. 10/801,556, filed on Mar. 17, 2004, now Pat. No. 7,292,526.

(30) Foreign Application Priority Data

Jul. 18, 2003 (JP) ................................ 2003-199294

(51) Int. Cl.
*H04B 7/216* (2006.01)
(52) U.S. Cl. ....................................................... 370/441
(58) Field of Classification Search .................. None
See application file for complete search history.

(56) References Cited

U.S. PATENT DOCUMENTS

| | | | |
|---|---|---|---|
| 5,812,546 A | 9/1998 | Zhou et al. | |
| 6,122,310 A * | 9/2000 | Ziemer et al. | 375/142 |
| 6,208,615 B1 | 3/2001 | Faruque et al. | |
| 6,212,219 B1 | 4/2001 | Shou et al. | |
| 6,320,897 B1 | 11/2001 | Fattouche et al. | |
| RE37,802 E | 7/2002 | Fattouche et al. | |
| 7,106,700 B2 * | 9/2006 | Freiberg et al. | 370/252 |
| 7,206,332 B2 * | 4/2007 | Kwan et al. | 370/441 |
| 7,292,526 B2 * | 11/2007 | Terabe | 375/130 |
| 2003/0099282 A1 * | 5/2003 | Magnusson | 375/140 |
| 2003/0112744 A1 * | 6/2003 | Baum et al. | 370/206 |
| 2004/0001472 A1 * | 1/2004 | Kwak et al. | 370/342 |
| 2004/0192315 A1 * | 9/2004 | Li et al. | 370/335 |
| 2005/0002357 A1 * | 1/2005 | Hu et al. | 370/332 |
| 2005/0025079 A1 | 2/2005 | Terabe | |
| 2005/0025098 A1 | 2/2005 | Terabe | |

FOREIGN PATENT DOCUMENTS

| | | |
|---|---|---|
| JP | 2002-152086 | 5/2002 |
| JP | 2002-238073 | 8/2002 |

OTHER PUBLICATIONS

Notification of Reasons for Rejection from Japanese Patent Office mailed on Sep. 25, 2006, in Japanese Patent Application No. 2003-199294 and English translation thereof.

* cited by examiner

*Primary Examiner* — Anh-Vu Ly
(74) *Attorney, Agent, or Firm* — Finnegan, Henderson, Farabow, Garrett & Dunner, L.L.P.

(57) ABSTRACT

A mobile communication system is provided for use in communication. The mobile communication system may include a radio control station (CS), a base station (BS), and a mobile station (MS). The BS is connected to the CS, and the MS may perform, with the BS, data communication in a parallel combinatory spread-spectrum (PCSS) scheme. The CS comprises at least a storage storing a plurality of communication parameters corresponding to the BS and a transmitter transmitting a determined parameter to the BS. The BS comprises a receiver receiving a determined parameter from the CS, a determining unit for determining transmitting power and a transmitter transmitting data generated by using the determined parameter and performing spreading processing to the MS. Further, the MS comprises a reproduction unit reproducing data by using the determined parameter and performing despreading processing.

4 Claims, 8 Drawing Sheets

FIG. 1

Figures 5, 6:
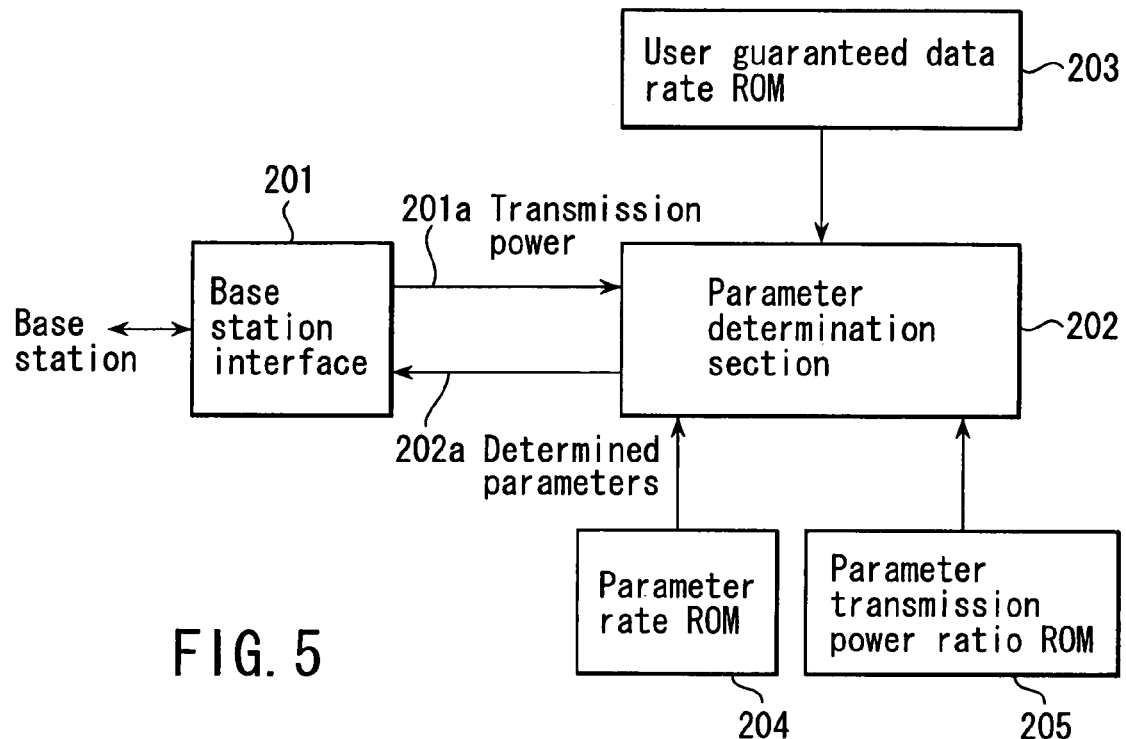

| Spreading code<br>A B C D | Selected spreading<br>-code data<br>(m = 2 bits) |
|---|---|
| 1 0 0 0 | 0 0 |
| 0 1 0 0 | 0 1 |
| 0 0 1 0 | 1 0 |
| 0 0 0 1 | 1 1 |

Mapping

Number of assignment spreading code = 4
Coding scheme = "multiple number is fixed to 1"

FIG. 2

| Spreading code<br>A B C D | Selected spreading<br>-code data<br>(m = 4 bits) |
|---|---|
| 0 0 0 0 | 0 0 0 0 |
| 1 0 0 0 | 1 0 0 0 |
| 0 1 0 0 | 0 1 0 0 |
| 0 0 1 0 | 0 0 1 0 |
| 0 0 0 1 | 0 0 0 1 |
| 1 1 0 0 | 1 1 0 0 |
| 1 0 1 0 | 1 0 1 0 |
| 1 0 0 1 | 1 0 0 1 |
| 0 1 1 0 | 0 1 1 0 |
| 0 1 0 1 | 0 1 0 1 |
| 0 0 1 1 | 0 0 1 1 |
| 1 1 1 0 | 1 1 1 0 |
| 1 1 0 1 | 1 1 0 1 |
| 1 0 1 1 | 1 0 1 1 |
| 0 1 1 1 | 0 1 1 1 |
| 1 1 1 1 | 1 1 1 1 |

Mapping

Number of assignment spreading code = 4
Coding scheme = "multiple number is not fixed"

First candidate

| Number k of assignment spreading codes (per one mobile station) / Coding scheme | 4 | 8 | 12 | 16 |
|---|---|---|---|---|
| Multiple number is not fixed | 6 | 12 | 16 | 20 |
| Multiple number is fixed to 6 | | | 15 | 19 |
| Multiple number is fixed to 4 | | 10 | 12 | 14 |
| Multiple number is fixed to 2 | 4 | 6 | 8 | 8 |
| Multiple number is fixed to 1 | 3 | 4 | 4 | 5 |
| Error-correcting-coding scheme A | 2 | 3 | 3 | 4 |
| Error-correcting-coding scheme B | 1 | 2 | 2 | 3 |

Second candidate — Third candidate

FIG. 3

First candidate

| Number k of assignment spreading codes (per one mobile station) / Coding scheme | 4 | 8 | 12 | 16 |
|---|---|---|---|---|
| Multiple number is not fixed | -1.5 | -1.0 | -0.5 | 0 |
| Multiple number is fixed to 6 | | | -3.0 | -1.0 |
| Multiple number is fixed to 4 | | -5.0 | -3.2 | -2.0 |
| Multiple number is fixed to 2 | -8.0 | -7.0 | -4.5 | -4.0 |
| Multiple number is fixed to 1 | -8.5 | -7.5 | -7.0 | -6.0 |
| Error-correcting-coding scheme A | -13.0 | -11.0 | -10.0 | -9.0 |
| Error-correcting-coding scheme B | -18.0 | -15.0 | -14.0 | -12.0 |

Reference value 0 [dB]

Second candidate — Third candidate

FIG. 4

| Communication service | User guaranteed data rate |
|---|---|
| Mail | 3 |
| Still picture | 5 |
| Moving picture | 10 |
|  |  |

PARAMETER DETERMINATION BASE STATION EMPLOYING PCSS SCHEME

CROSS-REFERENCE TO RELATED APPLICATIONS

This application is a divisional application of and claims benefit of application Ser. No. 10/801,556, filed Mar. 17, 2004, now U.S. Pat. No. 7,292,526 which is based upon and claims the benefit of priority from the prior Japanese Patent Application No. 2003-199294, filed Jul. 18, 2003, the entire contents of all of which are incorporated herein by reference.

BACKGROUND OF THE INVENTION

1. Field of the Invention

The present invention relates to a mobile communication system. More particularly it relates to a mobile communication system for determining optimal associated parameters of the parallel combinatory spread-spectrum scheme, and a radio control station, base station and mobile station for the system, and a parameter determination method employing the parallel combinatory spread-spectrum scheme.

2. Description of the Related Art

In mobile communication systems, a method for assigning associated parameters of the parallel combinatory spread-spectrum scheme is known (see, for example, Jpn. Pat. Appln. KOKAI Publication No. 2002-152086 (pages 7 to 11; FIG. 1 to 8).

Jpn. Pat. Appln. KOKAI Publication No. 2002-152086 discloses a technique for varying, in accordance with a transmission rate requested for data transmission, at least one of the associated parameters, such as spreading code length n, number $\bar{m}$ of spreading code candidates, and number (multiple number) k of selected spreading codes.

Jpn. Pat. Appln. KOKAI Publication No. 2002-152086 discloses another technique for selecting one of the combinations, which provide predetermined transmission rates, of associated parameters, such as spreading code lengths n, number $\bar{m}$ of spreading code candidates, and number k of selected spreading codes. The one combination is selected in light of the transmission accuracy required for data transmission, and/or the number of users to whom the number $\bar{m}$ is assigned, and/or the states of transmission channels.

In the conventional mobile communication system described in Jpn. Pat. Appln. KOKAI Publication No. 2002-152086, excessive resources may be required in base stations, since the system resources and radio resources assigned to each base station are not determined in consideration of overall resource saving.

BRIEF SUMMARY OF THE INVENTION

The present invention has been developed in light of the above problem. It aims to provide a mobile communication system capable of confirming the system resources (the number of spreading codes used) and radio resources (transmission power) of each base station, and capable of assigning, to the resources, associated parameters of the parallel combinatory spread-spectrum scheme, suitable for the margins of the resources. The invention also aims to provide a radio control station, base station and mobile station for the system, and a parameter determination method employing the parallel combinatory spread-spectrum scheme.

According to a first aspect of the invention, there is provided a mobile communication system including a radio control station, a base station connected to the radio control station, and a mobile station which performs, with the base station, data communication in a parallel combinatory spread-spectrum scheme, the radio control station comprising: a storage which stores a plurality of data communication rates and a plurality of transmission power ratios, the plurality of the data communication rates and the plurality of the transmission power ratios corresponding to a plurality of parameters used in the parallel combinatory spread-spectrum scheme, the plurality of the parameters indicating numbers of assignment spreading codes and multicoding schemes; a first acquisition unit configured to acquire, from the storage, at least one of the parameters, an acquired one of the parameters corresponding to the number of the assignment spreading codes and the transmission power ratio, at least one data communication rate corresponding to at least acquired one of the parameters being higher than and close to a data communication guaranteed rate of a communication service; a second acquisition unit configured to acquire, from the base station, the number of assignment spreading codes and a transmission power ratio; a computation unit configured to perform computation, if the first acquisition unit acquires a plurality of the parameters, based on each of the numbers of the assignment spreading codes acquired from the storage and each of transmission power ratios acquired from the storage, and the number of assignment spreading codes and a transmission power ratio acquired from the base station, the computation unit determining, from the computation, one parameter suitable for a margin for the number of the assignment spreading codes acquired from the base station and a margin for the transmission power ratio acquired from the base station; and a transmitter which transmits a determined parameter to the base station, the base station comprising: a receiver which receives the determined parameter from the radio control station; a determination unit configured to determine transmission power for transmitting data to the mobile station, based on a transmission power ratio corresponding to the determined parameter; and a first transmitter which transmits data with the transmission power to the mobile station, the data being generated by using the determined parameter and performing spreading processing, and the mobile station comprising: a reproduction unit configured to reproduce the data by using the determined parameter and performing despreading processing.

According to a second aspect of the invention, there is provided a radio control station comprising: a storage which stores a plurality of data communication rates and a plurality of transmission power ratios, the plurality of the data communication rates and the plurality of the transmission power ratios corresponding to a plurality of parameters used in the parallel combinatory spread-spectrum scheme employed in data communication between a base station and a mobile station, the plurality of the parameters indicating numbers of assignment spreading codes and multicoding schemes; a first acquisition unit configured to acquire, from the storage, at least one of the parameters, an acquired one of the parameters corresponding to the number of the assignment spreading codes and the transmission power ratio, at least one data communication rate corresponding to at least acquired one of the parameters being higher than and close to a data communication guaranteed rate of a communication service; a second acquisition unit configured to acquire, from the base station, the number of assignment spreading codes and a transmission power ratio; a computation unit configured to perform computation, if the acquisition unit acquires a plurality of the parameters, based on each of the numbers of the assignment spreading codes acquired from the storage and each of transmission power ratios acquired from the storage, and the number of assignment spreading codes and a transmission power ratio acquired from the base station, the computation unit determining, from the computation, one parameter suitable for a margin for the number of the assignment spreading codes acquired from the base station and a margin for the transmission power ratio acquired from the base station; and a transmitter which transmits a determined parameter to the base station.

According to a third aspect of the invention, there is provided a base station comprising: a receiver which receives, from a radio control station, a determined parameter used in a parallel combinatory spread-spectrum scheme employed in data communication between the base station and a mobile station, the determined parameter indicating numbers of assignment spreading codes and multicoding schemes; a first transmitter which transmits the determined parameter to the mobile station; a determination unit configured to determine transmission power used to transmit data to the mobile station, based on a transmission power ratio corresponding to the determined parameter; and a second transmitter which transmits, to the mobile station with the transmission power, data obtained by performing spread processing on the first-mentioned data, using the determined parameters.

According to a fourth aspect of the invention, there is provided a mobile communication system including a transmitter, and a receiver which performs data communication of a parallel combinatory spread-spectrum scheme with the transmitter, the transmitter comprising: a storage which stores a plurality of data communication rates and a plurality of transmission power ratios, the plurality of the data communication rates and the plurality of the transmission power ratios corresponding to a plurality of parameters used in the parallel combinatory spread-spectrum scheme, the plurality of the parameters indicating numbers of assignment spreading codes and multicoding schemes; a first acquisition unit configured to acquire, from the storage, at least one of the parameters, an acquired one of the parameters corresponding to the number of the assignment spreading codes and the transmission power ratio, at least one data communication rate corresponding to at least acquired one of the parameters being higher than and close to a data communication guaranteed rate of a communication service; a second acquisition unit configured to acquire, from the transmitter, the number of assignment spreading codes and a transmission power ratio; a computation unit configured to perform computation, if the first acquisition unit acquires a plurality of the parameters, based on each of the numbers of the assignment spreading codes acquired from the storage and each of transmission power ratios acquired from the storage, and the number of assignment spreading codes and a transmission power ratio acquired from the transmitter, the computation unit determining, from the computation, one combination of the parameters suitable for a margin for the number of assignment spreading codes and a margin for the transmission power ratio; a first transmitter which transmits a determined parameter to the receiver; a determination unit configured to determine transmission power used to transmit data to the receiver; and a second transmitter which transmits, to the receiver with the transmission power, data obtained by performing spread processing on the first-mentioned data, using the determined parameter, the receiver comprising: a receiver which receives the determined parameter from the transmitter; and a reproduction unit configured to reproduce received data using the determined parameter.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

Figure 7:
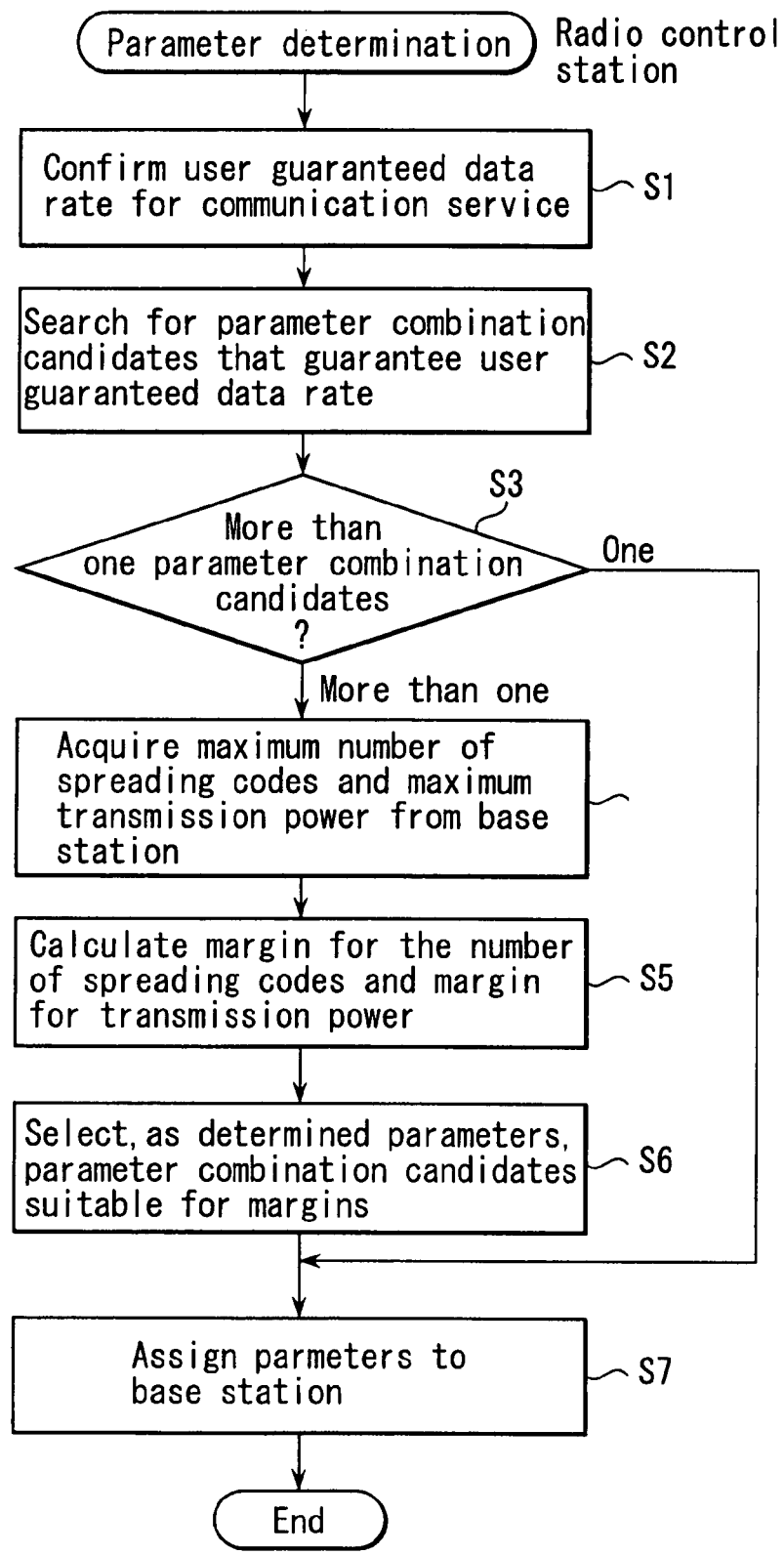
Figure 8A:
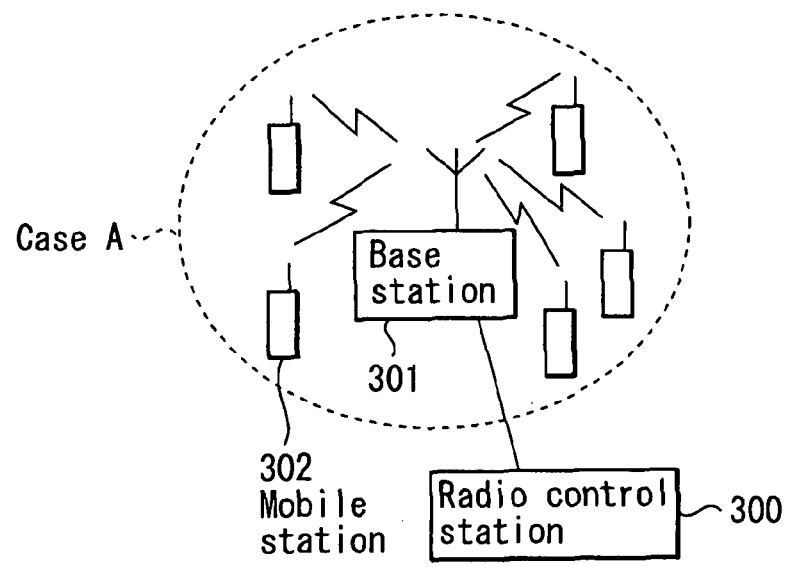
Figure 8B:
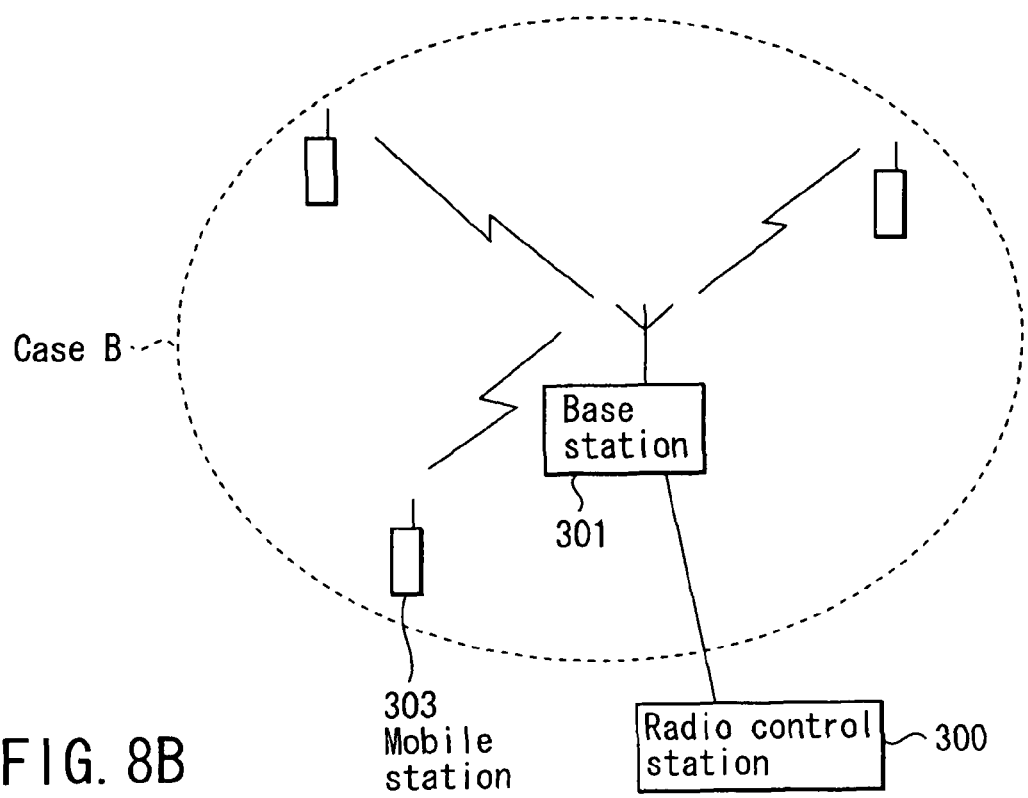
Figure 9:
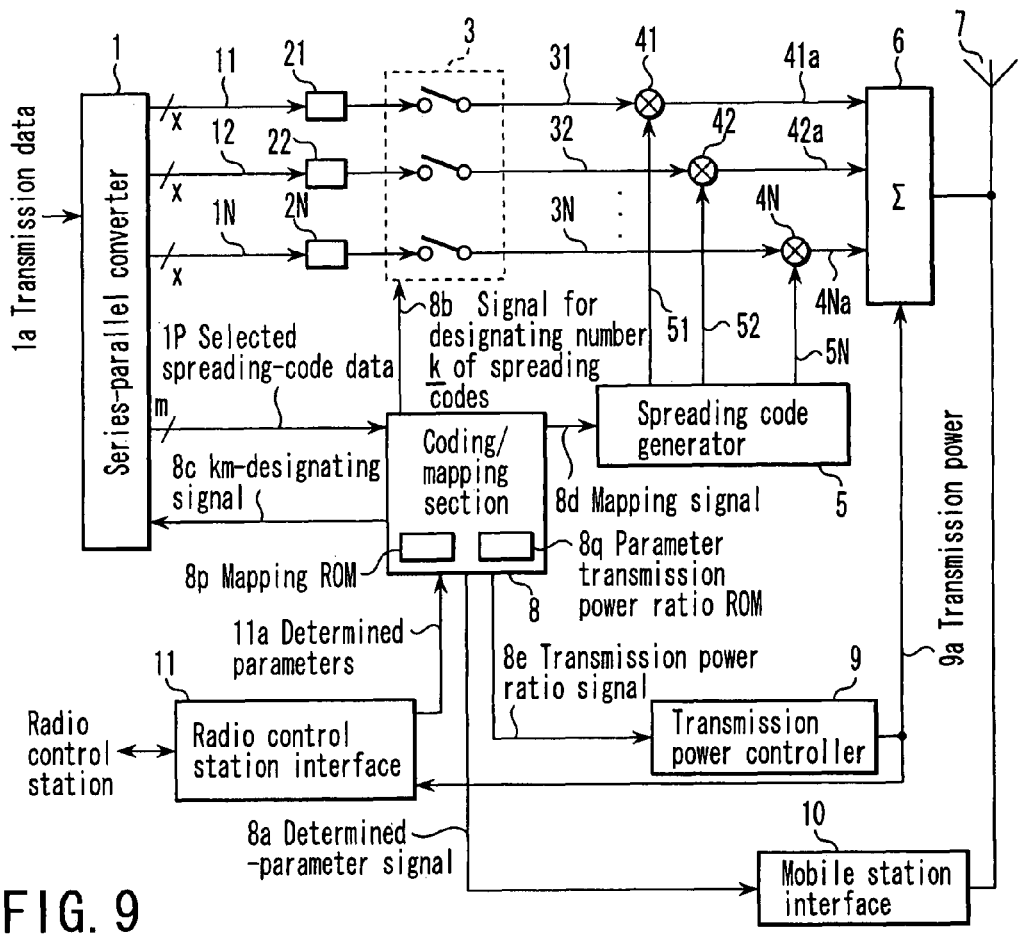
Figure 10:
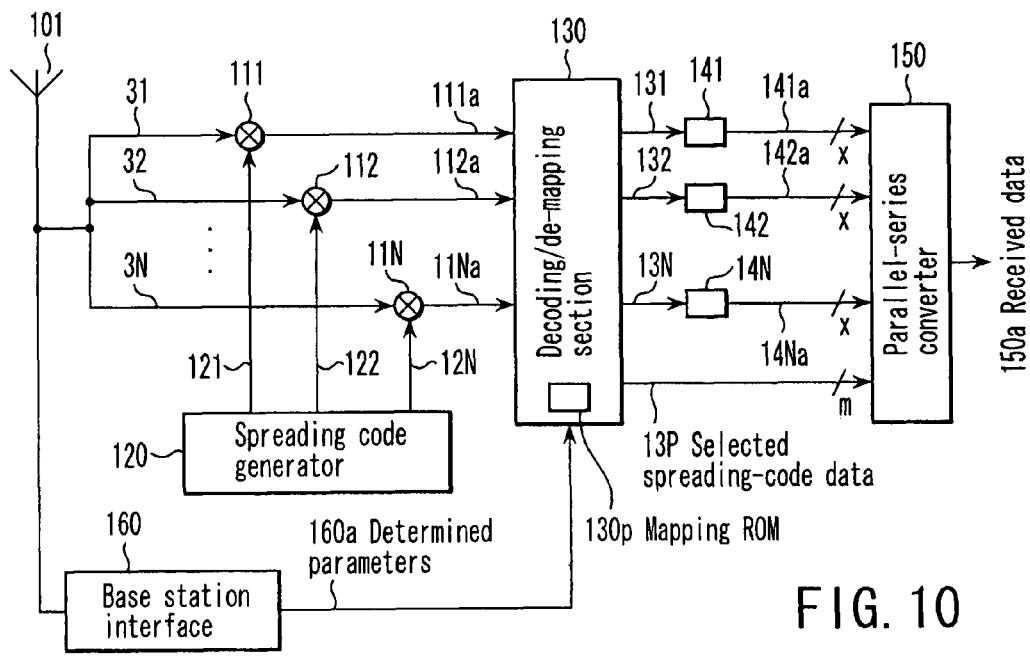
Figure 11:
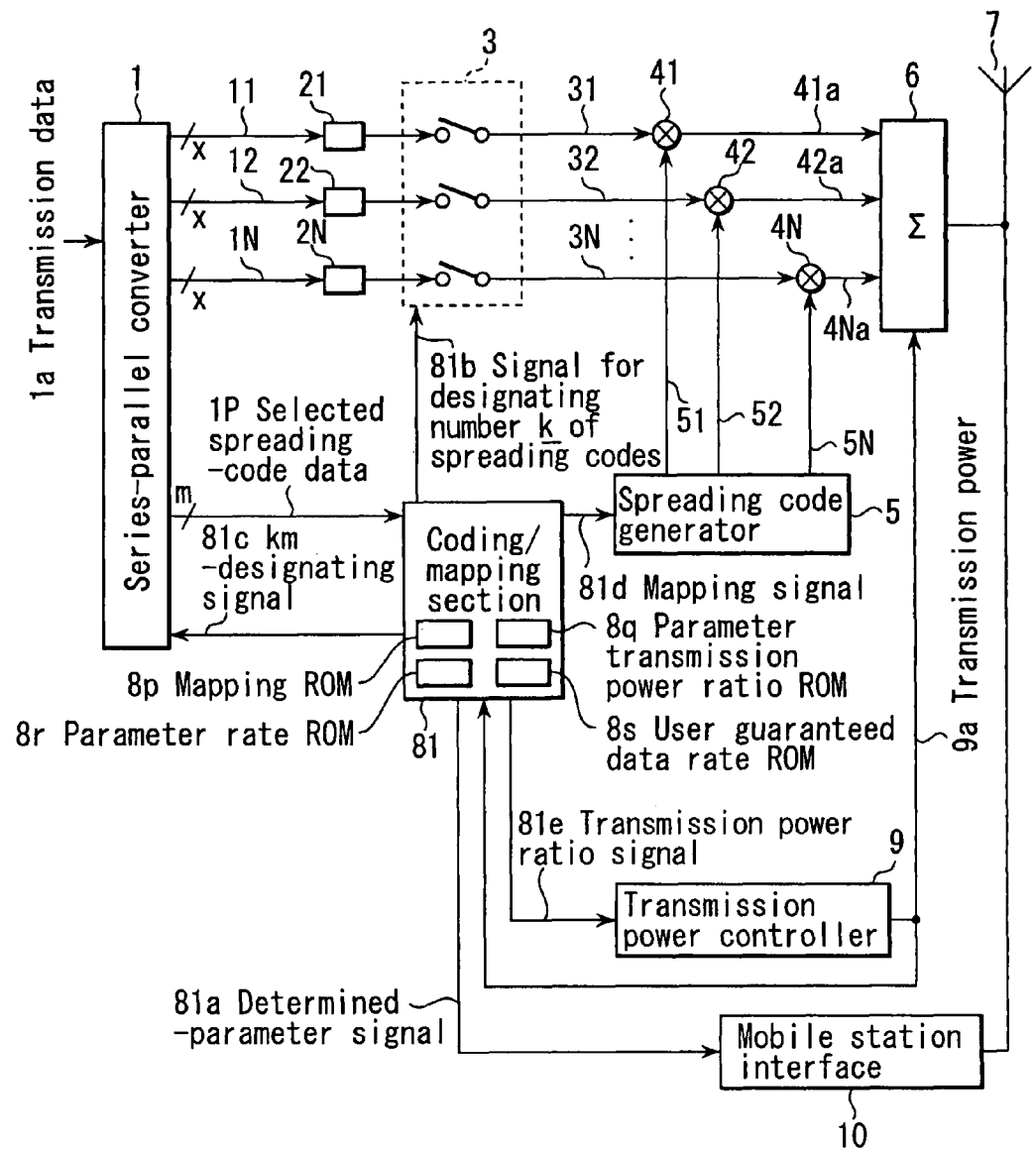
Figure 12:
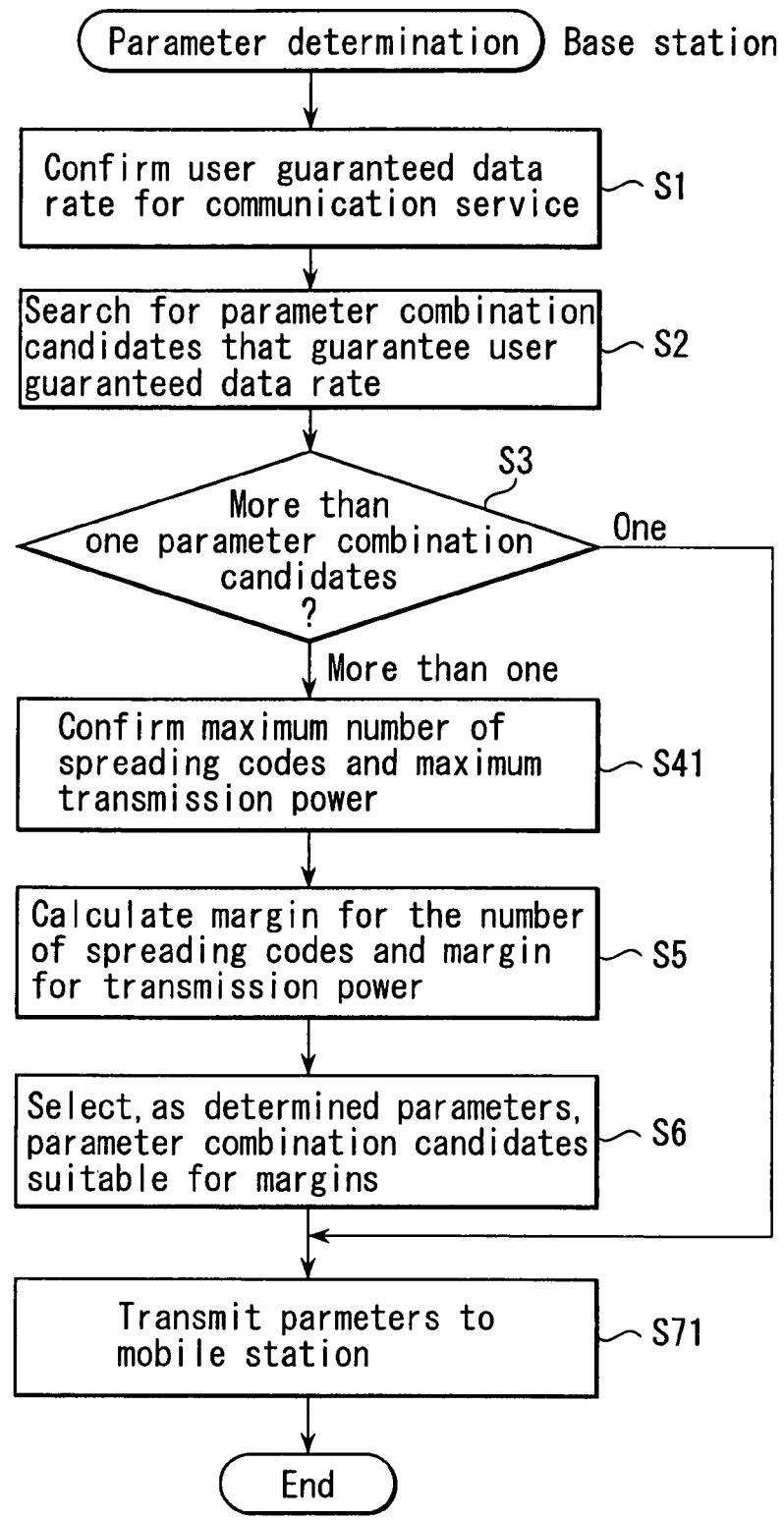

FIG. 1 is a mapping table;
FIG. 2 is another mapping table;
FIG. 3 is a parameter rate table;
FIG. 4 is a parameter transmission power ratio table used in first and second embodiments of the invention;
FIG. 5 is a block diagram illustrating an essential part of a radio control station incorporated in a mobile communication system according to the first embodiment of the invention;
FIG. 6 is a user guaranteed data rate table used in the first and second embodiments;
FIG. 7 is a flowchart useful in explaining the operation of the radio control station incorporated in the mobile communication system of the first embodiment;
FIGS. 8A and 8B are schematic views useful in explaining the operation of the mobile communication systems of the first and second embodiments;
FIG. 9 is a block diagram illustrating an essential part of a base station incorporated in the mobile communication system of the first embodiment;
FIG. 10 is a block diagram illustrating an essential part of a mobile station incorporated in the mobile communication systems of the first and second embodiments;
FIG. 11 is a block diagram illustrating an essential part of a base station incorporated in the mobile communication system of the second embodiment; and
FIG. 12 is a flowchart useful in explaining the operation of the base station incorporated in the mobile communication system of the second embodiment.

DETAILED DESCRIPTION OF THE INVENTION

Embodiments of the invention will be described in detail with reference to the accompanying drawings.

FIGS. 1 to 12 depict radio control stations (radio CSs), base stations (BSs) and mobile stations (MSs) incorporated in mobile communication systems according to the embodiments.

For data communication between a base station and mobile station, the parallel combinatory spread-spectrum (PCSS) scheme is utilized. This scheme is used to perform, for instance, spread processing based on associated parameters. Associated parameters include, for example, the number of assignment spreading codes, and "coding scheme" indicating the multiple number of assigned spreading codes.

FIGS. 1 and 2 are mapping tables of spreading codes and selected spreading-code data. Selected spreading-code data (of m-bits) is assigned in accordance with the state of use of a plurality of spreading codes. FIG. 1 depicts the case where the number k of assignment spreading codes is 4, and the coding scheme whose content indicates that "the multiple number is fixed to 1" is employed.

Assume that the four (=k) assignment spreading codes are spreading codes A, B, C and D. That the multiple number is fixed to 1 in "coding scheme" means that the number of spreading codes, which are included in the four spreading codes A, B, C and D and simultaneously used, is 1.

Accordingly, if the number of spreading codes that are used simultaneously is set "1" and if the one spreading code is A, "1", "0", "0" and "0" are placed in the sections for the spreading codes A, B, C and D, respectively, in the mapping tables shown in FIGS. 1 and 2. Similarly, if only the spreading code B is used, "0", "1", "0" and "0" are placed. If only the spreading code C is used, "0", "0", "1" and "0" are placed. If only the spreading code D is used, "0", "0", "0" and "1" are placed. These four combinations of spreading codes are indicated by selected spreading-code-data items "00", "01", "10" and "11".

FIG. 2 depicts the case where the number k of assignment spreading codes is 4, and "coding scheme" indicating that "the multiple number is not fixed" is employed. Since "coding scheme" indicating that "the multiple number is not fixed" is employed, sixteen combinations ("0000" to "1111") of four spreading codes A, B, C and D exist. That is, the number of spreading codes simultaneously used ranges from 0 to 4. These sixteen combinations are indicated by 4-bit selected spreading-code-data items "0000" to "1111" in the mapping of FIG. 2.

In the parallel combinatory spread-spectrum scheme, spread sequence data by which a number k of spreading codes are multiplied and the above-mentioned m-bit selected spreading-code data can be transmitted as transmission data. Accordingly, the data transmission rate depends upon the number k of assignment spreading codes, and "coding scheme", which are associated parameters.

FIG. 3 is a parameter rate table showing data transmission rates. Specifically, in this table, the data transmission rate per unit is represented by a number of bits for each combination of the number k of assignment spreading codes and the "coding scheme". The "unit" in "per unit" means a number of data bits that can be transmitted per one symbol, on condition that the spreading code is switched from one to another per one symbol.

In FIG. 3, the number k of assignment spreading codes per one mobile station is set to "4", "8", "12" and "16", and the "coding scheme" is set to "the multiple number is not fixed", "the multiple number is fixed to 6", "the multiple number is fixed to 4", "the multiple number is fixed to 2", "the multiple number is fixed to 1", "error-correcting-coding scheme A", and "error-correcting-coding scheme B". With respect to each combination of these values of k and these "coding scheme", the data transmission rate per unit is shown.

In the "error-correcting-coding scheme A" and "error-correcting-coding scheme B", an error correcting code is imparted to part of the m-bit selected spreading-code-data items in FIGS. 1 and 2. In this case, since the error correcting code increases the degree of redundancy, the data transmission rate is reduced compared to the case where no such code is imparted. Further, if the "error-correcting-coding scheme B" uses a larger number of error correcting codes than the "error-correcting-coding scheme A", the data transmission rate in the "error-correcting-coding scheme B" is lower than the "error-correcting-coding scheme A".

Concerning the number k of assignment spreading codes, the larger the value of k, the lower the data transmission rate.

Concerning the "coding scheme", the data transmission rate is highest when the "coding scheme" is set to "the multiple number is not fixed". Further, the greater the multiple number, the higher the data transmission rate.

First Embodiment

A demodulation circuit, incorporated in a receiver utilizing the parallel combinatory spread-spectrum scheme, determines the energy level of received data by spreading processing, thereby determining the spreading code used. At this time, if the "coding scheme" is set to "the multiple number is fixed to 1", only one spreading code is used at a time, the energy level differences in spreading codes are conspicuous, whereby a determination error may not easily occur. On the other hand, if the "coding scheme" is set to "the multiple number is fixed to 1", only one spreading code is used at a time, the energy level differences in spreading codes are conspicuous. Therefore, a determination error may not easily occur.

In short, in the table shown in FIG. 3, if the "coding scheme" is set to "the multiple number is not fixed", a determination error most easily occurs, while if the "error-correcting-coding scheme B" is employed, a determination error least easily occurs. However, the data transmission rate is highest if the "coding scheme" is set to "the multiple number is not fixed", while it is lowest if the "error-correcting-coding scheme B" is employed.

FIG. 4 is a parameter transmission power ratio table prepared in light of the degree of reliability during demodulation. Specifically, FIG. 4 shows the transmission power ratio at the transmission side for each combination of associated parameters as in the case of FIG. 3. As stated in the section concerning determination errors, the reliability is lowest if the "coding scheme" is set to "the multiple number is not fixed", therefore the transmission power of the transmission side needs to be increased. Further, the larger the number k of assignment spreading codes, the more transmission power is needed to transmit a large number of code signals.

In FIG. 4, the transmission power ratio is set as a reference value of 0 [dB], which is obtained if the parameters that require the highest transmission power are employed. In other words, the transmission power ratio is set to 0 [dB], which is obtained if the "coding scheme" is set to "the multiple number is not fixed", and if the number k of assignment spreading codes is "16". Further, the transmission power ratio [dB] required for each combination of parameters is preset from design information or experiments.

The configuration and operation of the radio control station employed in the mobile communication system will be described.

FIG. 5 is a block diagram illustrating an essential part of the radio control station of the mobile communication system. As shown, the radio control station comprises a base station interface 201, parameter determination section 202, user guaranteed data rate ROM 203, parameter rate ROM 204, parameter transmission power ratio ROM 205, etc.

The user guaranteed data rate ROM 203 prestores communication rates guaranteed to mobile stations as users, the communication rates being rates of the parallel combinatory spread-spectrum scheme related to various communication services provided in the mobile communication system.

FIG. 6 depicts a user guaranteed rate table stored in the user guaranteed data rate ROM 203. In the ROM 203, the user guaranteed data rate for one of the communication services, e.g. mail communication, is set to "3", that for still picture communication to "5", and that for moving picture communication to "10". The unit used here is defined on the same standard as the unit described with reference to FIG. 3.

The parameter rate ROM 204 stores the contents of the parameter rate table of FIG. 3. The parameter transmission power ratio ROM 205 stores the contents of the parameter transmission power ratio table of FIG. 4. Further, the base station interface 201 is connected to a base station (not shown) for receiving, as transmission power information 201a, information concerning the maximum number of spreading codes and maximum transmission power of the base station.

FIG. 7 is a flowchart useful in explaining the operation of the parameter determination section 202 of the radio control station. Referring now to FIGS. 3 to 7, a description will be given of a method for determining associated parameters used in the radio control station.

When a communication service is requested by a mobile station, the parameter determination section 202 checks the user guaranteed data rate ROM 203 to confirm the user guaranteed data rate corresponding to the communication service. If the service is a still picture communication service, a user guaranteed data rate of "5" is acquired (step S1 in FIG. 7).

Subsequently, the parameter determination section 202 checks the parameter rate ROM 204 to extract therefrom parameter combination candidates that guarantee a user guaranteed data rate of "5" or more. For instance, in the case of FIG. 3, a parameter combination, "the number k of assignment spreading codes is 4" and "the multiple number is not fixed", is extracted as a first combination candidate (data transmission rate=6). Further, another parameter combination, "k is 8" and "the multiple number is fixed to 2", is extracted as a second combination candidate (data transmission rate=6). Yet further, another parameter combination, "k is 16" and "the multiple number is fixed to 1", is extracted as a third combination candidate (data transmission rate=5). These first to third candidates are listed.

After that, the parameter determination section 202 searches the parameter rate ROM 204 and the parameter transmission power ratio ROM 205 for numbers k of assignment spreading codes and transmission power ratios corresponding to the first to third candidates. In the example, for the first candidate, "4" and "−1.5 [dB]" are acquired as the value k and transmission power. Similarly, for the second candidate, "8" and "−7.0 [dB]" are acquired as the value k and transmission power. For the third candidate, "16" and "−6.0 [dB]" are acquired as the value k and transmission power (step S2 in FIG. 7). Since the third candidate requires a larger number of spreading codes and higher power than the second candidate, it is excluded.

Thereafter, the parameter determination section 202 determines whether a plurality of candidates exist (step S3 in FIG. 7). In this case, since two candidates are extracted (the answer at the step S3 is YES), the information concerning the maximum number of spreading codes and maximum transmission power of the base station is received as the transmission power 201a via the base station interface 201. Since, however, the maximum number of spreading codes and maximum transmission power of the base station are predetermined, information thereof may be acquired beforehand from the base station. Further, the parameter determination section 202 receives, from the base station via the base station interface 201, information on the number of spreading codes and transmission power currently used by the base station (step S4 in FIG. 7).

Subsequently, the parameter determination section 202 subtracts the number of spreading codes currently used from the maximum number of spreading codes acquired at the step S4, and subtracts the current transmission power from the maximum transmission power, thereby obtaining respective margins (step S5 in FIG. 7).

After that, the parameter determination section 202 determines which one of the first and second candidates is suitable, thereby determining the parameters (step S6 in FIG. 7). Since these margins are of the number of spreading codes and transmission power measured in different units, their margin ratios to the maximum number of spreading codes and transmission power may be calculated instead of the margins themselves.

After that, the parameter determination section 202 transmits, to the base station via the base station interface 201, the determined parameters, e.g. a value k of 8 and coding scheme information "the multiple number is fixed to 2" (step S7 in FIG. 7).

The operation of the above-described ration control station will be described.

FIGS. 8A and 8B shows the mobile communication system. In the case A shown in FIG. 8A, since many mobile stations 302 are accessing a base station 301, a large number of spreading codes are used, and hence the margin for spreading codes is small. On the other hand, the margin for the transmission power in the base station 301 is not small, since the mobile stations 302 are accessing the base station 301 at short distances therefrom and hence the transmission power used by the base station 301 is low. Accordingly, a radio control station 300 selects the first candidate, in which the number of spreading codes is relatively small and the transmission power is relatively high, and transmits the parameters to the base station 301 and sets them therein.

In the case B shown in FIG. 8B, since a small number of mobile stations 303 are accessing the base station 301, a small number of spreading codes are used, and hence the margin for spreading codes is large. On the other hand, the margin for the transmission power in the base station 301 is small, since the mobile stations 303 are accessing the base station 301 from long distances and hence the transmission power used by the base station 301 is high. Accordingly, the radio control station 300 selects the second candidate, in which the number of spreading codes is relatively large and the transmission power is relatively low, and transmits the parameters to the base station 301 and sets them therein.

A description will be given of the configuration and operation of the base station that has received the determined parameters from the radio control station.

FIG. 9 is a block diagram illustrating an essential part of the base station. The base station comprises a series-parallel converter 1, a number N of modulators 21, 22, ... 2N, a number N of switches 3, a number N of multipliers 41, 42, ..., 4N, spreading code generator 5 for generating a number N of spreading codes, an adder 6, an antenna 7, a coding/mapping section 8, a transmission power controller 9, a mobile station interface 10, a radio control station interface 11, etc.

The coding/mapping section 8 contains a mapping ROM 8p that stores the contents of, for example, the mapping table shown in FIG. 2. More specifically, the mapping ROM 8p stores mapping tables (for example, 25 mapping tables) for all parameters corresponding to all combinations of the number k of assignment spreading codes and the coding schemes. The coding/mapping section 8 also contains a parameter transmission power ROM 8q that stores the contents of the parameter transmission power ratio table shown in FIG. 4.

"N" represents the maximum number of spreading codes assigned to each mobile station that performs data communication of the parallel combinatory spread-spectrum scheme.

The determined parameters transmitted from the radio control station 300 are received by the radio control station interface 11 of the base station 301, and transmitted as a determined-parameter signal 11a to a coding/mapping section 8. The coding/mapping section 8, in turn, transmits the signal as a determined-parameter signal 8a to the mobile station interface 10. The mobile station interface 10 performs radio processing on the received signal or predetermined-parameter signal, and transmits the resultant signal to a mobile station 302 or 303 through the antenna 7. This is because the mobile stations 302 and 303 operate based on the same determined parameters as the base station.

After that, the coding/mapping section 8 performs setting based on the parallel combinatory spread-spectrum scheme. This will be described in detail, using, as an example, the case where the first-candidate parameters are supplied from the radio control station 300. As stated above, the first-candidate parameters are the information items indicating that "the number k of assignment spreading codes is 4" and that "the multiple number is not fixed".

Firstly, the coding/mapping section 8 transmits a designating signal 8b designating the value of k (i.e., 4), to the switch 3 and spreading code generator 5.

Furthermore, the coding/mapping section 8 checks the mapping ROM 8p to confirm whether the combination of k=4 and the information indicating the coding scheme, "the multiple number is not fixed", corresponds to the mapping table shown in FIG. 2. As a result, the section 8 acquires information indicating that the number m of bits of selected spreading-code data is "4", and supplies the series-parallel converter 1 with a km-designating signal 8c designating m=4 and k=4.

Upon receiving series transmission data 1a to be transmitted from the base station to a mobile station, the series-parallel converter 1 converts it into x-bit data, outputs x-bit data items corresponding to the designated ones of a number N of sequence data items 11, 12, . . . , 1N, and converts m-bit selected spreading-code data 1P. Specifically, upon receiving the km signal 8c, the transmission data 1a is distributed to those of the number N of sequential x-bit data items 11, 12, . . . , 1N corresponding to the number k (=4) of assignment spreading codes, and is also distributed to the m-bit selected spreading-code data 1P. That is, the transmission data 1a is distributed to data of (4x+4) bits. The x-bit data is set depending upon the design. It may be one-bit data.

A number k of sequence data items are modulated by a number k of ones of modulators 21, 22, . . . , 2N, and input to a number k of ones of multipliers 41, 42, . . . , 4N via a number k of ones of the switches 3.

The m-bit selected spreading-code data 1P is sent to the coding/mapping section 8. The coding/mapping section 8 performs mapping of a number k of spreading codes A, B, C and D in accordance with the sixteen combinations of the bits contained in the m-bit selected spreading-code data 1P (see in FIG. 2) stored in the mapping ROM 8p, and outputs a mapping signal 8d to the spreading code generator 5.

The spreading code generator 5 generates spreading codes A, B, C and D in accordance with the mapping signal 8d, and inputs the other terminals of a number k of ones of multipliers 41, 42, . . . , 4N. Which one of the sixteen combinations is selected depends upon the content of the m-bit selected spreading-code data 1P, and also depends upon the transmission data 1a.

Each of the multipliers 41, 42, 43 and 44 corresponding to a number k (k=4) of spreading codes A, B, C and D multiplies one of a number k of sequence data items input via one terminal thereof, by a corresponding one of the spreading codes A, B, C and D input via the other terminal thereof, and outputs the multiplication result to the adder 6. For instance, the multiplier 41 multiplies an x-bit data item by the spreading code A, and the multiplier 42 multiplies another x-bit data item by the spreading code B. The adder 6 adds the multiplication results of the four multipliers 41, 42, 43 and 44, converts the addition result into a radio signal and outputs the signal through the antenna 7 to a mobile station.

In the "error-correcting-coding scheme A" or "error-correcting-coding scheme B" included in the "coding scheme" as a parameter, the coding/mapping section 8 performs mapping after an error-correcting signal is attached to the selected spreading-code data 1P, thereby acquiring a generation pattern of spreading codes.

A description will now be given of transmission power control by the base station. The coding/mapping section 8 checks the parameter transmission power ratio ROM 8q (see FIG. 4), thereby reading therefrom a transmission power ratio "−1.5 dB" as a determined parameter of the first candidate, and transmitting, to the transmission power controller 9, a power ratio signal 8e indicating the read ratio.

The transmission power controller 9 performs standard transmission power control for mobile stations. In addition, the controller 9 generates transmission power 9a involving the transmission power ratio "−1.5 dB", and transmits it to the adder 6. The adder 6 transmits transmission data, as a previous addition result, through the antenna 7 based on the transmission power 9a. As a result, the transmission power can be effectively used as intended by the radio control station 300.

Moreover, a signal indicating the transmission power 9a from the transmission power controller 9 is transmitted to the radio control station 300 via the radio control station interface 11, and used as one factor for determining parameters in the radio control station.

A description will be given of the configuration and operation of a mobile station that receives determined parameters from the base station.

FIG. 10 is a block diagram illustrating an essential part of the mobile station. The mobile station comprises an antenna 101, a number N of multipliers 111, 112, . . . 11N, a spreading code generator 120, a decoding/de-mapping section 130, a number N of demodulators 141, 142, . . . , 14N, a parallel-series converter 150, a base station interface 160, etc. Further, the decoding/de-mapping section 130 contains a mapping ROM 130p that stores the contents of a mapping table, similar to the mapping ROM 8p contained in the coding/mapping section 8 of the base station.

The determined parameters transmitted from the base station 301 are transmitted to the base station interface 160 via the antenna 101 of the mobile station, and output as a determined-parameter signal 160a to the decoding/de-mapping section 130.

The decoding/de-mapping section 130 performs settings for the parallel combinatory spread-spectrum scheme. Firstly, it acquires, from the determined-parameter signal 160a, information indicating that the number k of assignment spreading codes is 4, and information indicating that the "coding scheme" is that "the multiple number is not fixed". After that, the section 130 checks the mapping ROM 130p, thereby confirming whether the combination of the information indicating that k is 4 and the information indicating that the "coding scheme" is that "the multiple number is not fixed" exists in the mapping table of FIG. 2. As a result, the number m of bits of the selected spreading-code data is determined to be 4.

In this state, the data supplied from the base station via the antenna 101 is input to the number N of multipliers 111, 112, . . . 11N corresponding to spreading codes 121, 122, ..., 12N. The multipliers 111, 112, ... 11N multiply the input data by the spreading codes 121, 122, ..., 12N (spreading codes A, B, C, D, ...) supplied from the spreading code generator 120, respectively, thereby performing despreading. Signals 111a, 112a, ..., 11Na indicating the multiplication results are supplied to the decoding/de-mapping section 130.

The decoding/de-mapping section 130 checks the energy levels of the received signals 111a, 112a, ..., 11Na. Which one (or ones) of a number k of spreading codes is used in each signal is determined, beginning from the signal of the highest energy level. For each signal, all the spreading codes are not always detected. For example, in the case of the four (k=4) assignment spreading codes shown in FIG. 2, a spreading code (or spreading codes) included in the sixteen combinations is detected. Only the spreading code A may be detected, or all the spreading codes A, B, C and D may be detected.

The despreading output of each spreading codes detected in the signals 111a, 112a, ..., 11N is reproduced to obtain a maximum number k of sequence data items (each data item is of x-bits). These data items are supplied to corresponding ones of the demodulators 141, 142, ..., 14N. The corresponding demodulators perform demodulation and output the demodulation results to the parallel-series converter 150.

Further, the decoding/de-mapping section 130 performs de-mapping of the detected spreading code(s) with reference to the mapping ROM 130p, thereby acquiring selected spreading-code data 13P of m-bits (m=4). For example, if the spreading codes B, C and D included in the four spreading codes are detected, the selected spreading-code data 13P of m-bits (m=4) "0111" corresponding to the detected spreading code="0111" is acquired. This is sent to the parallel-serial converter 150.

The parallel-serial converter 150 rearranges, in series, the demodulated data from the demodulators, and the selected spreading-code data 13P, thereby reproducing, into received data 150a, the transmission data transmitted from the base station.

In the "error-correcting-coding scheme A" or "error-correcting-coding scheme B" included in the "coding scheme" as a parameter, the decoding/de-mapping section 130 extracts an error-correcting signal from the m-bit selected spreading-code data acquired by de-mapping, and performs error-correcting processing. Further, the section 130 supplies the parallel-series converter 150 with the selected spreading-code data, as the selected spreading-code data 13P, obtained by subtracting the error-correcting signal from the m-bit selected spreading-code data.

As stated above, when parameters that satisfy a predetermined user guaranteed data rate for communication services are determined, parameter candidates can be selected, which are suitable to the margin for the number of spreading codes (system resources) and margin for the transmission power (radio resources) that are assigned to each base station. This enables the system resources and radio resources of each base station to be effectively used.

Further, the radio control station generally manages a plurality of base stations, and performs processing, such as assignment of different spreading codes to a plurality of base stations during, for example, software handover. Accordingly, the radio control station can perform it without increasing, for example, the number of hardware elements.

Second Embodiment

A mobile communication system according to a second embodiment of the invention will be described. The second embodiment differs from the first embodiment in that in the former, not the radio control station but the base station determines parameters.

FIG. 11 is a block diagram illustrating an essential part of a base station incorporated in the mobile communication system of the second embodiment. In FIG. 11, elements similar to those in FIG. 9 are denoted by corresponding reference numerals, and no description is given thereof. A coding/mapping section 81 comprises, as well as the mapping ROM 8p and parameter transmission power ratio ROM 8q, a parameter rate ROM 8r that stores the contents of the parameter rate table (see FIG. 3), and a user guaranteed data rate ROM 8s that stores the contents of the user guaranteed data rate table (see FIG. 6). The section 81 does not have the radio control station interface 11 since no parameters are transmitted from the radio control station.

FIG. 12 is a flowchart useful in explaining the operation of the coding/mapping section 81 incorporated in the second embodiment. In FIG. 12, step numerals similar to those in FIG. 7 denote corresponding operations.

Firstly, the base station searches for parameter candidates that guarantee the user guaranteed data rate or more of a requested communication service. Specifically, the coding/mapping section 81 checks the user guaranteed data rate ROM 8s, thereby confirming the user guaranteed data rate of the communication service. For instance, if the service is a still picture communication service, a user guaranteed data rate of "5" is acquired (step S1 in FIG. 12).

Subsequently, the coding/mapping section 81 checks the parameter rate ROM 8r, thereby extracting a parameter candidate (or candidates) that guarantees a user guaranteed data rate of "5" or more but close thereto (step S2 in FIG. 12).

If there are a plurality of parameter candidates (Yes at the step S3 of FIG. 12), the coding/mapping section 81 confirms the maximum number of spreading codes and maximum transmission power of the base station. Furthermore, the coding/mapping section 81 reads a current transmission power 9a from the transmission power control section 9. Further, the section 81 confirms the number of currently used spreading codes it manages (step S41 in FIG. 12).

Subsequently, the coding/mapping section 81 calculates the current margin for the number of spreading codes and that for the transmission power (step S5 in FIG. 12), and selects a parameter candidate (or parameter candidates) suitable for the calculated margins (step S6 in FIG. 12).

After that, the coding/mapping section 81 outputs the selected parameter candidate(s), as determined parameters 81a, to the mobile station interface 10. The interface 10, in turn, transmits a radio signal indicating the determined parameters 81a, to a mobile station via the antenna 7, thereby performing a negotiation with the mobile station (step S71 in FIG. 12). Since the operation of the base station after the negotiation is the same as that in the first embodiment, it is not described.

As described above, when parameters that satisfy a predetermined user guaranteed data rate for communication services are determined, parameter candidates can be selected, which are suitable to the margin for the number of spreading codes (system resources) and margin for the transmission power (radio resources) that are beforehand assigned to each base station. This enables the system resources and radio resources of each base station to be effectively used.

In addition, the input information used to perform the process of the embodiment is beforehand assigned to each base station. Therefore, each base station can perform the process of the embodiment without increasing, for example, the number of hardware elements or accessing the radio control station. Accordingly, the embodiment is suitable for the case where the radio control station is not needed to control the resources of a plurality of base stations and suitable for a communication system, such as a wireless LAN, for performing data communication based on the parallel combinatory spread-spectrum scheme. The invention is applicable to transmitters and receivers incorporated in wireless LANs or other communication systems.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A base station comprising:
a receiver which receives, from a radio control station, a determined parameter used in a parallel combinatory spread-spectrum scheme employed in data communication between the base station and a mobile station, the determined parameter indicating numbers of assignment spreading codes and multicoding schemes;
a first transmitter which transmits the determined parameter to the mobile station;
a determination unit configured to determine transmission power used to transmit data to the mobile station, based on a transmission power ratio corresponding to the determined parameter;
a second transmitter which transmits, to the mobile station with the transmission power, data obtained by performing spread processing on the data to be transmitted to the mobile station, using the determined parameter; and
a mapping ROM which stores a plurality of selected spreading-code-data items and a plurality of spreading codes, the selected spreading-code-data items being mapped into the spreading codes based on the number of the assignment spreading codes and the multicoding schemes, and
wherein the spreading codes read from the mapping ROM and corresponding to the determined parameter, and data to be transmitted to the mobile station are subjected to a predetermined operation, and an operation results are transmitted to the mobile station.

2. A base station comprising:
a receiver which receives, from a radio control station, a determined parameter used in a parallel combinatory spread-spectrum scheme employed in data communication between the base station and a mobile station, the determined parameter indicating numbers of assignment spreading codes and multicoding schemes;
a first transmitter which transmits the determined parameter to the mobile station;
a determination unit configured to determine transmission power used to transmit data to the mobile station, based on a transmission power ratio corresponding to the determined parameter;
a second transmitter which transmits, to the mobile station with the transmission power, data obtained by performing spread processing on the data to be transmitted to the mobile station, using the determined parameter; and
a parameter transmission power ratio ROM which stores transmission power data corresponding to the number of assignment spreading codes and the multicoding schemes, and
wherein transmission power corresponding to the determined parameter is read from the parameter transmission power ratio ROM, and transmission power used to transmit data to the mobile station is controlled based on a read transmission power.

3. A base station comprising:
a receiver which receives, from a radio control station, a determined parameter used in a parallel combinatory spread-spectrum scheme employed in data communication between the base station and a mobile station, the determined parameter indicating numbers of assignment spreading codes and multicoding schemes;
a first transmitter which transmits the determined parameter to the mobile station;
a determination unit configured to determine transmission power used to transmit data to the mobile station, based on a transmission power ratio corresponding to the determined parameter;
a second transmitter which transmits, to the mobile station with the transmission power, data obtained by performing spread processing on the data to be transmitted to the mobile station, using the determined parameter; and
a memory which stores a plurality of selected spreading-code-data items and a plurality of spreading codes, the selected spreading-code-data items being mapped into the spreading codes based on the number of the assignment spreading codes and the multicoding schemes, and
wherein the spreading codes read from the memory and corresponding to the determined parameter, and data to be transmitted to the mobile station are subjected to a predetermined operation, and an operation results are transmitted to the mobile station.

4. A base station comprising:
a receiver which receives, from a radio control station, a determined parameter used in a parallel combinatory spread-spectrum scheme employed in data communication between the base station and a mobile station, the determined parameter indicating numbers of assignment spreading codes and multicoding schemes;
a first transmitter which transmits the determined parameter to the mobile station;
a determination unit configured to determine transmission power used to transmit data to the mobile station, based on a transmission power ratio corresponding to the determined parameter;
a second transmitter which transmits, to the mobile station with the transmission power, data obtained by performing spread processing on the data to be transmitted to the mobile station, using the determined parameter; and
a parameter transmission power ratio memory which stores transmission power data corresponding to the number of assignment spreading codes and the multicoding schemes, and
wherein transmission power corresponding to the determined parameter is read from the parameter transmission power ratio memory, and transmission power used to transmit data to the mobile station is controlled based on a read transmission power.

* * * * *